United States Patent
Lauer et al.

(10) Patent No.: US 10,946,695 B2
(45) Date of Patent: Mar. 16, 2021

(54) FLEXIBLE, DUAL PURPOSE WHEEL SPEED HARNESS AND BREATHER LINE

(71) Applicant: Caterpillar Inc., Deerfield, IL (US)

(72) Inventors: Trenton Wayne Lauer, Oro Valley, AZ (US); Joseph Lee Rottman, Decatur, IL (US); Quintin Wayne McDaniel, Marana, AZ (US)

(73) Assignee: Caterpillar Inc., Peoria, IL (US)

( * ) Notice: Subject to any disclaimer, the term of this patent is extended or adjusted under 35 U.S.C. 154(b) by 267 days.

(21) Appl. No.: 16/027,493

(22) Filed: Jul. 5, 2018

(65) Prior Publication Data

US 2020/0009906 A1    Jan. 9, 2020

(51) Int. Cl.
*B60B 27/00* (2006.01)
*G01P 1/02* (2006.01)
*B60B 27/02* (2006.01)

(52) U.S. Cl.
CPC .......... *B60B 27/0068* (2013.01); *G01P 1/026* (2013.01); *B60B 27/001* (2013.01); *B60B 27/0052* (2013.01); *B60B 27/02* (2013.01); *B60B 2900/113* (2013.01); *B60B 2900/212* (2013.01)

(58) Field of Classification Search
CPC . B60B 27/0068; B60B 27/0052; B60B 27/02; B60B 2900/113; B60R 16/0207; B60R 16/0215; B60R 16/027; G01P 1/026; G01P 3/443; F01M 13/0011
See application file for complete search history.

(56) References Cited

U.S. PATENT DOCUMENTS

| | | | |
|---|---|---|---|
| 6,145,559 A * | 11/2000 | Ingram, II | B60C 23/003 152/417 |
| 8,813,548 B2 | 8/2014 | Rottman et al. | |
| 10,461,599 B2 * | 10/2019 | Tamura | H02K 5/22 |
| 2010/0163323 A1 | 7/2010 | Pickholz | |
| 2013/0276523 A1 * | 10/2013 | Rottman | G01P 1/026 73/115.07 |
| 2017/0158073 A1 | 6/2017 | Nuernberger | |
| 2017/0232913 A1 * | 8/2017 | Fukazu | B60L 50/50 307/10.1 |
| 2019/0222015 A1 * | 7/2019 | Ito | B60R 16/0215 |
| 2019/0329725 A1 * | 10/2019 | Omae | B60R 16/0215 |
| 2020/0079302 A1 * | 3/2020 | Omae | H02G 15/113 |

FOREIGN PATENT DOCUMENTS

CN   205137299 U   4/2016
JP   2011168228 A   9/2011

* cited by examiner

*Primary Examiner* — Timothy J Thompson
*Assistant Examiner* — Amol H Patel
(74) *Attorney, Agent, or Firm* — Law Office of Kurt J. Fugman LLC (57) ABSTRACT

A method for attaching a clamping assembly to the frame of a machine includes attaching a sensor assembly to the spindle of a machine such that a wire harness extends through the internal cavity of the spindle and out from the spindle, fishing the wire harness through a breather line, and attaching the wiring harness to the chassis of a machine.

20 Claims, 6 Drawing Sheets

FLEXIBLE, DUAL PURPOSE WHEEL SPEED HARNESS AND BREATHER LINE

TECHNICAL FIELD

The present disclosure relates to wheel speed sensor wiring harnesses used on earth moving, construction, and mining equipment and the like for measuring the wheel speed of the machine. Specifically, the present disclosure relates to wheel speed sensor wiring harnesses that may be less prone to need replacement or maintenance.

BACKGROUND

Machines, such as haul trucks are routinely used in the earth moving, construction, and mining industries, etc. to move heavy payloads. These haul trucks are equipped with front wheel speed sensor wiring harnesses so that the rate of rotation of the wheels can be measured, and the speed of the vehicle can be calculated. These front wheel speed sensor wiring harnesses may need to be replaced or maintained periodically. For example, these front wheel speed sensor wiring harnesses may be designed to have a target life. In some applications, these front wheel speed sensors have not been reaching this target life for various reasons.

There are two common reasons why the wheel speed sensor wiring harness may need to be replaced or maintained earlier than planned. First, the environment and application in which these wiring harnesses are used is extremely harsh. For example, the path along which the wiring harness may extend varies since the connection of the wiring harness extends from the fixed chassis of the vehicle to a moving wheel. This joint experiences both rotations, side-to-side and up-and-down movement relative to the chassis of the machine. Also, it is very prone to impact from dirt, mud, rocks, water cannons, and surrounding components (other hoses and the front struts, etc.). This may damage the wiring harness during normal operation.

Second, the design of the wiring harness is complex comprising two harnesses, multiple sheet metal plates, a breather line, and other miscellaneous required hardware. Given the number of components and their necessary attachment to each other, these wiring harnesses are complex. This complexity may lead to variability in assembling the harnesses. Also, improper field service may happen that can result in the improper mating of components, which in turn may yield more problems after the wiring harness is used further.

U.S. Pat. No. 8,813,548 to Rottman et al. discloses a sensor mounting arrangement of a wheel assembly having a spindle defining an elongated cavity. The spindle supports a wheel. The sensor mounting arrangement comprises a tube, a wire harness, and a sensor assembly. The tube is configured to be partially received in the elongated cavity of the spindle. The wire harness is routed through the tube. The sensor assembly is connected to a leading end of the wire harness wherein the leading end is configured to be disposed proximal to the wheel.

However, this reference fails to disclose a robust method for attaching the wiring harness to the spindle and chassis such that the aforementioned problems may be avoided.

SUMMARY

A wire harness and breather line subassembly according to an embodiment of the present disclosure may comprise an annular flexible hose defining a longitudinal axis, a first axial end, a second axial end, and an aperture extending completely along the longitudinal axis from the first axial end to the second axial end. A wiring harness may be disposed in the annular flexible hose positioned at least partially adjacent the longitudinal axis, defining at least partially an annular channel between the annular flexible hose and the wiring harness. The wiring harness includes wiring disposed in the wiring harness.

A wire harness and breather line assembly for use with a machine according to an embodiment of the present disclosure comprises a chassis, a spindle movably attached to the chassis, a wheel rotatably attached to the spindle, and an annular flexible hose defining a longitudinal axis, a first axial end, a second axial end, and an aperture extending completely along the longitudinal axis from the first axial end to the second axial end. A wiring harness may be disposed in the annular flexible hose positioned at least partially adjacent the longitudinal axis, defining at least partially an annular channel between the annular flexible hose and the wiring harness. The wiring harness may include wiring disposed in the wiring harness. The wiring harness may be attached to the chassis and may be attached to the spindle. The annular flexible hose may be attached to the chassis and may be attached to the spindle.

A method for attaching a wiring harness and breather line assembly to the frame of a machine according to an embodiment of the present disclosure comprises attaching a sensor assembly to the spindle of a machine such that a wire harness extends through the internal cavity of the spindle and out from the spindle, fishing the wire harness through a breather line, and attaching the wiring harness to the chassis of a machine.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

The present disclosure is directed to an assembly which may include an outer flexible, robust, protective breather line hose that is combined with an internal wiring harness to form a single line. The single line may be routed from the vehicle chassis to the front wheel serving as both a pressure equalizing breather line for oil inside the front wheel and as a routing channel for a vulnerable and important wiring harness stretching across the front wheel flex joint, extending from the chassis to a front wheel. The single line may be fabricated of a flexible, robust, protective material (e.g., a harder, more robust polyurethane jacketed cable) configured to withstand impacts, extreme temperatures, as well as other conditions associated with exposure across the front wheel flex joint. The harder, and more robust polyurethane jacketed cable may also allow the harness to slide freely inside the hose, helping to limit the possibility of rubbing of the individual wires, which may fray the wires.

The dimensions of the hose may be configured not only to allow a clearance between the outer diameter of the harness and the inner diameter of the hose sufficient to facilitate the passage of air therethrough, which, in one embodiment, includes a ¾ inch inner-diameter sized hose to allow for both the harness and air to share the same path. Furthermore, the length of the hose may be specifically configured to account for and permit the full range of motion of the front wheels without interfering with, engaging, or being engaged, disconnected, and/or impacted by the motion of the front wheels and/or any components associated therewith. Also, the hose may be configured to maintain a length and an orientation to facilitate the passage of air therethrough.

In various embodiments, instead of having two lines (a breather line and a harness), there is only a single line having the function of both a breather line and a wiring harness (conduit). That is to say, the pressure equalizing feature of the breather line and the signal transference feature of the wiring harness may be achieved simultaneously, simplifying assembly and the construction of these various assemblies and components.

More specifically, a single, common part is provided so the need for multiple parts may be avoided. This simplifies assembly since the number of parts that needs to be handled is reduced. This, in turn, may improve serviceability and value to the dealer/customer.

In addition, this design may allow the connector attached to the hose to be placed in a lower risk zone on the machine and for the breather hose to be located in an area that is less likely to get covered by debris. Furthermore, these components may be relocated into a zone that may be less likely to get hit by debris projected by the tire. The net effect of these two benefits is an improvement in the reliability and lifespan of the design.

Furthermore, the decrease in part numbers may result in less inventory and stocking overhead costs.

Conventional wisdom has been that these two functions needed to be kept separate. For example, inside the breather hose, it has unexpectedly been analyzed (via e.g. finite element analysis and computational fluid dynamics) and confirmed that the hose can be designed such that the breather functions normally with a cable inside of it. Also, it is difficult to design for the needed range of motion. More specifically, it has been unexpectedly analyzed that such a hose may survive a very harsh flex-joint having up to a 96-degree range of motion in the X-Y plane and more than 300 mm movement along the Y-axis in some applications.

Figure 1:
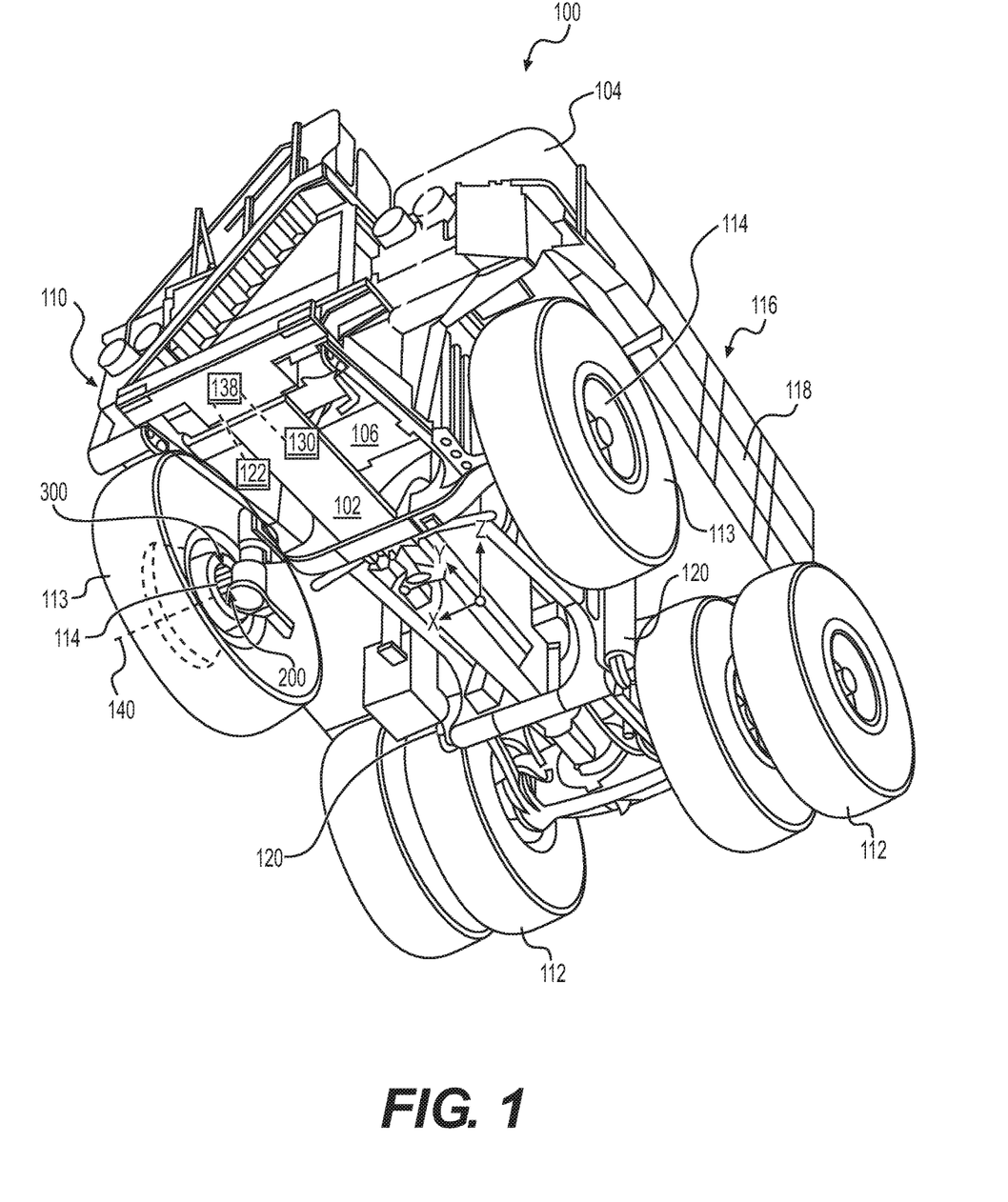
FIG. 1 is a bottom perspective view of a machine in the form of a haul truck that employs a wiring harness and breather line subassembly and a wiring harness and breather line assembly according to various embodiments of the present disclosure.
Figure 2:
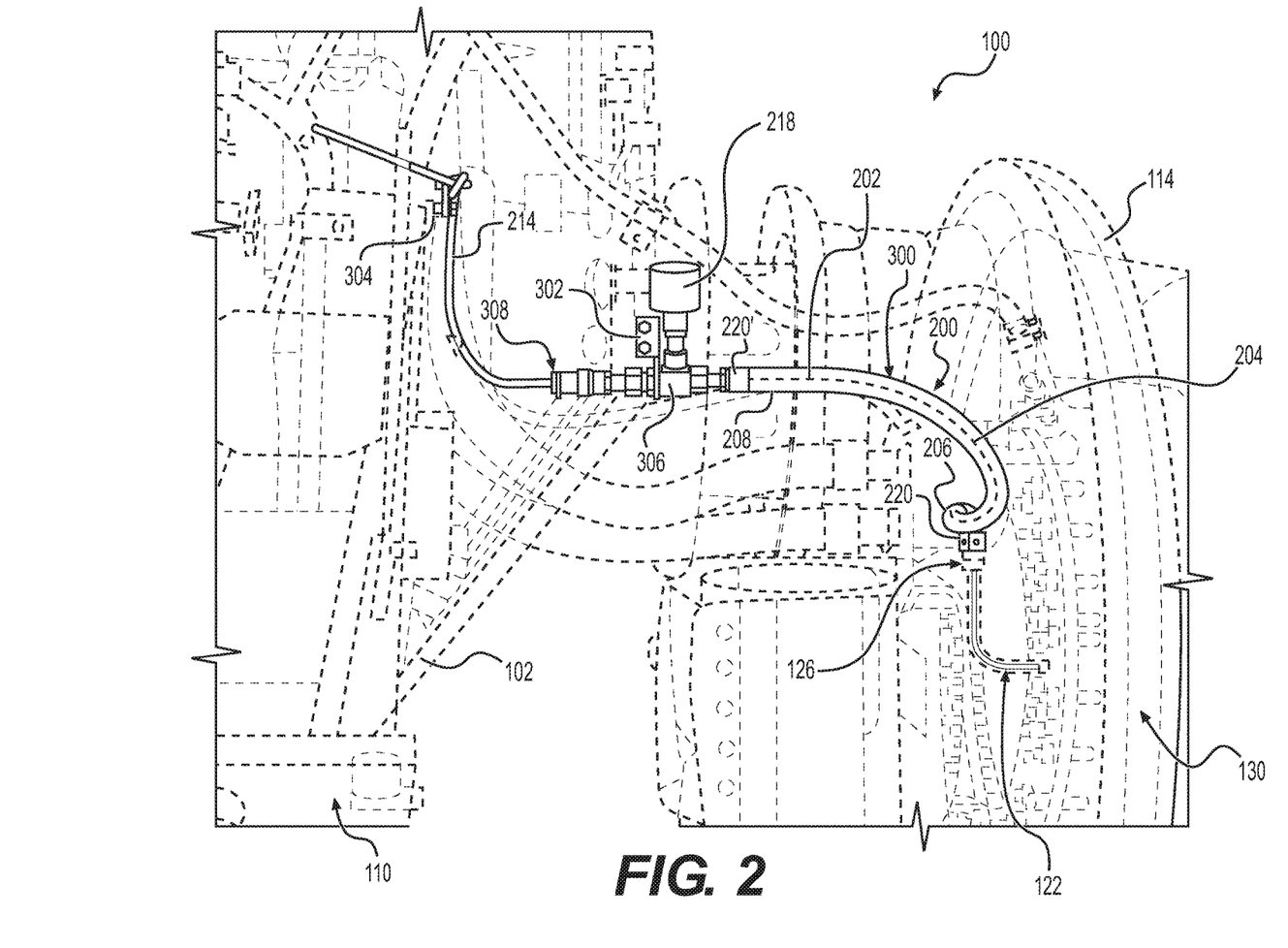
FIG. 2 is a front view of a front right wheel and an associated wiring harness and breather line assembly and subassembly according to an embodiment of the present disclosure, showing a flexible hose connecting the wiring harness from the chassis of the machine of FIG. 1 (e.g. a haul truck) to the spindle.
Figure 3:
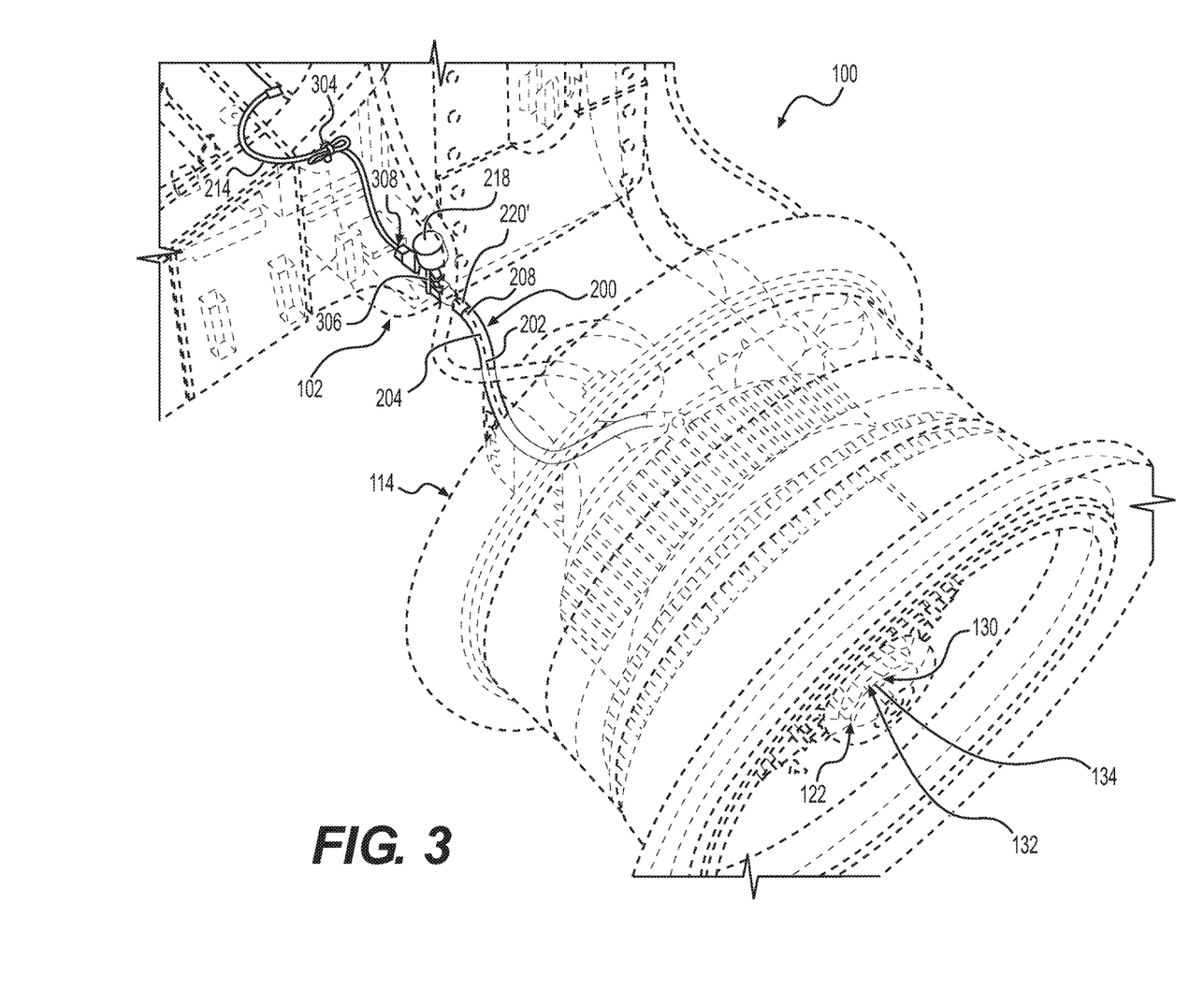
FIG. 3 is a perspective view of the front left wheel and its associated wheel speed harness and breather line assembly and subassembly of FIG. 2.

Various embodiments of an apparatus and a method for providing a wire harness and breather line subassembly, a wire harness and breather line assembly for use with a machine, and a method for assembling the same and attaching the same to a chassis of a machine will now be described. FIGS. 1 thru 3 show an embodiment of a machine 100 in the form of a haul truck that includes an embodiment of a wire harness and breather line subassembly 300, a wire harness and breather line assembly 200, and/or a method 400 of use/assembly associated with the wire harness and breather line subassembly 300 or the wire harness and breather line assembly 200 constructed in accordance with principles of the present disclosure.

The machine 100 includes a chassis 102 and an operator cabin 104 mounted on the chassis 102. The operator cabin 104 may include control elements, such as a joystick, steering wheel, etc. for controlling operations of the machine 100. A powertrain including a power source 106 is disposed in the machine 100 to supply power for performing various operations of the machine 100. The power source 106 may be, but not limited to, an internal combustion engine, a hybrid engine, and non-conventional power sources such as batteries and fuel cells. The powertrain (not clearly shown) may further include a transmission unit for transmission of the power from the power source to a set of ground engaging members 112 (such as tires 113, which may be attached to the wheels 114). In an alternative embodiment, the set of ground engaging members 112 may be tracks powered by a drive sprocket, etc.

The machine 100 may further includes an implement system 116 coupled to the chassis 102. The implement system 116 may be configured to manipulate, move, or store work material (e.g. a bucket, a haul bed 118) and may be pivotally coupled to chassis 102. A set of front struts 120 are also shown.

Figure 4:
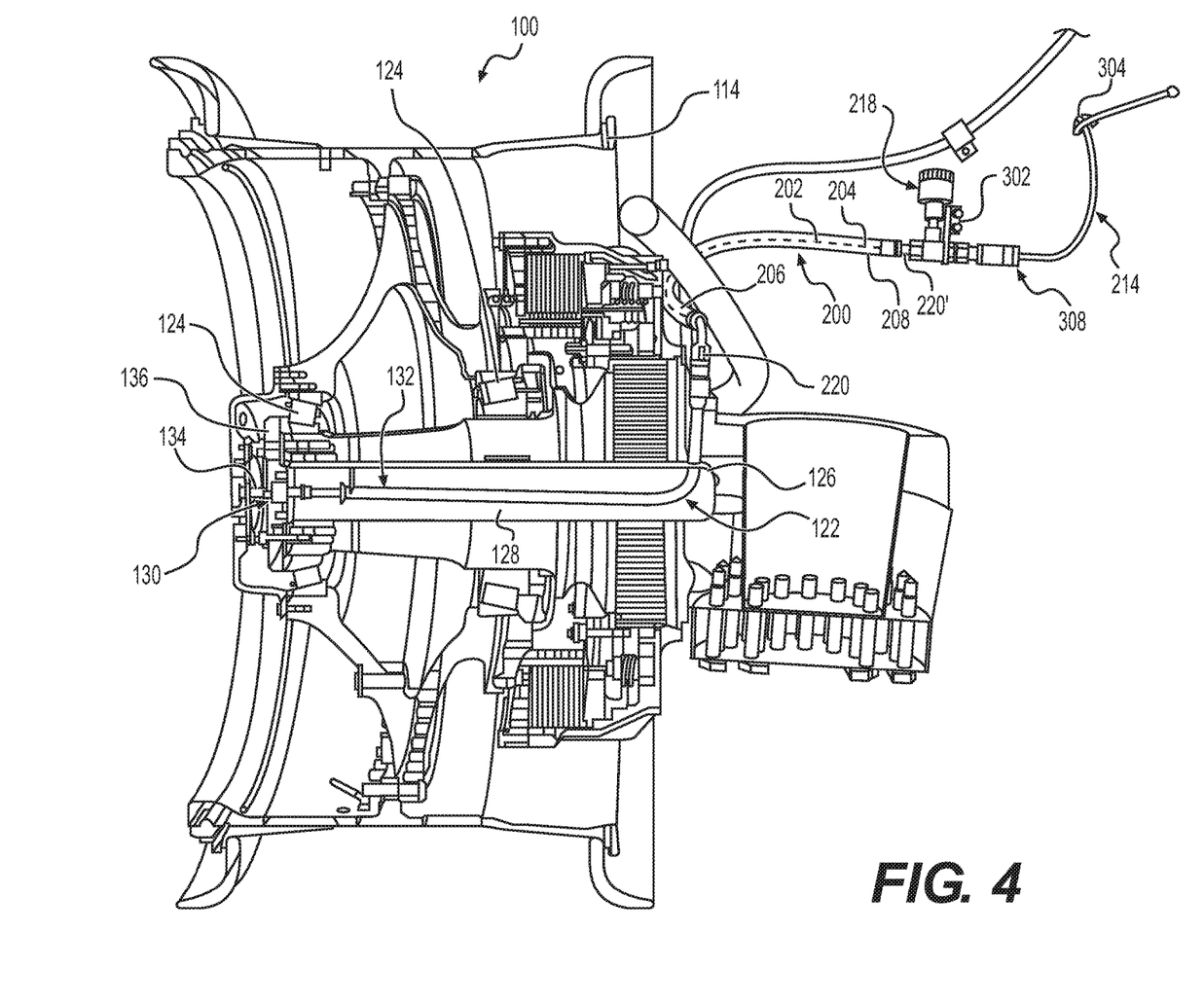
FIG. 4 is a front partial sectional view of the front right wheel and its associated wheel speed harness and breather line assembly and subassembly of FIG. 2.

As best seen in FIG. 4, the machine 100 further includes a lubricating system 122 coupled to the wheels 114 for supplying oil or other lubricant to the wheels 114 and their associated bearings 124. In the illustrated embodiment, the lubricating system 122 includes a spindle 126 with an internal cavity 128 that is in fluid communication with the bearings 124 of the wheel assembly. Oil may be disposed in the internal cavity 128 that may be pressurized to cause the oil to flow through various passages to supply lubricant to the bearings 124. Furthermore, brake cooling and brake actuation lines may be located in the same area.

With continued reference to FIG. 4, the machine 100 further includes a speed sensing system 130. The speed sensing system 130 includes a sensor assembly 132 disposed in the internal cavity with a sensor 134 disposed in the end cap 136 of the spindle 126 proximate a portion of the wheel 114 for sensing the speed of the wheel 114. The sensor assembly 132 may take any suitable form including the sensor assembly disclosed in U.S. Pat. No. 8,813,548, commonly owned by the assignee of the present disclosure. Accordingly, a detailed description of this sensor assembly 132 is not warranted. Either or both of the speed sensing system 130 and lubricating system 122 is/are typically in communication with the ECU 138 (electronic control unit) of the machine 100 (see FIG. 1) to monitor and report to the operator, etc. the speed of the vehicle and/or the level of the lubricant, etc.

Historically, the lubricating system 122 and the speed sensing system 130 have been assembled separately from each other onto the machine 100.

Although the embodiments of the present disclosure are described in conjunction with a wiring harness and breather line assembly 200 or subassembly 300 for monitoring the speed of the wheel and for adjusting the oil pressure in the wheel assembly simultaneously, it will be appreciated that the various embodiments may be used for other purposes while using essentially the same method and/or apparatus.

While the arrangement is illustrated in connection with a haul truck, the arrangement disclosed herein has universal applicability in various other types of machines commonly used in the construction, mining or earthmoving industries. The term "machine" may refer to any machine that performs some type of operation associated with an industry such as mining, earth moving or construction, or any other industry known in the art. For example, the machine may be an excavator, wheel loader, bulldozer, grader, etc. Moreover, one or more implements (e.g. a bucket, a haul bed) may be connected to the machine. Such implements may be utilized for a variety of tasks, including, for example, manipulating a work material such as the ground, dirt, rocks, etc.

Focusing now on FIGS. 2 thru 5, a wire harness and breather line assembly for use with a machine according to an embodiment of the present disclosure will now be discussed. The assembly 200 comprises a chassis 102 and a spindle 126 movably attached to the chassis 102. For example, the spindle 126 may rotate in the X-Y plane shown in FIG. 1 (e.g. about an axis parallel to the Z axis). Also, a wheel 114 is rotatably attached to the spindle 126 about a rotational axis 140, such as along a direction parallel to the X axis when the spindle 126 is aligned in a direction parallel to the X-axis.

Referring again to FIGS. 2 thru 5, the assembly 200 further comprises an annular flexible hose 202 defining a longitudinal axis 204, a first axial end 206, a second axial end 208, and an aperture 210 extending completely along the longitudinal axis 204 from the first axial end 206 to the second axial end 208.

Figure 5:
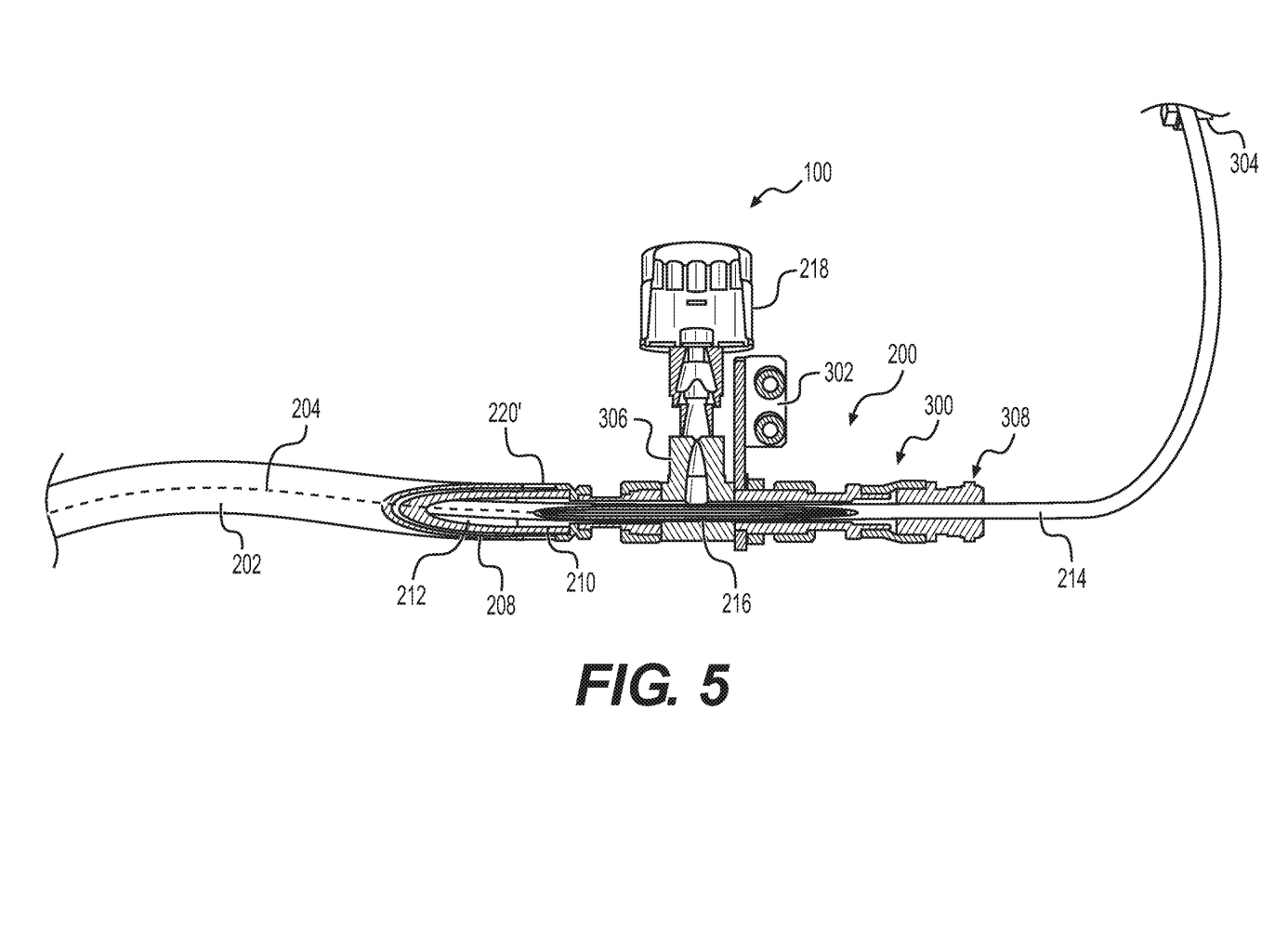
FIG. 5 is a sectional view of the flexible hose/breather line used in FIG. 2.

As best seen in FIG. 5, a wiring harness 212 may be disposed in the annular flexible hose 202 positioned at least partially adjacent the longitudinal axis 204. This arrangement defines at least partially an annular channel 212 between the wall of the annular flexible hose 202 and the wiring harness 200. This annular channel 212 is typically filled with air and/or oil, allowing pressure in the internal cavity 128 of the spindle 126 (see FIG. 1) to be adjusted in a manner that will be further explained later herein.

With continued reference to FIG. 5, the wiring harness 214 (may also be referred to as a conduit) includes wiring 216 disposed in the wiring harness 214. The wiring harness 214 may be attached to the chassis 102 and may be attached to the spindle 126 in a manner that will explained in further detail later herein. Similarly, the annular flexible hose 202 may be attached to the chassis 102 and may be attached to the spindle 126 in a manner that will explained in further detail later herein.

In some embodiments, the wiring 214 may include three different conductors of 18 gage bare copper stranded wires with XLPE polyethylene insulation having a nominal wall thickness of 0.35 mm. All three conductors and their associated insulation may be covered by a cable jacket made from black polyurethane with a nominal wall thickness of 2.52 mm. The polyurethane material of the cable jacket may have a hardness measured on a Shore A scale with a durometer equal to 40+/−5 points. The total outer diameter of this cable assembly has a nominal diameter of 10 mm.

Likewise, the annular flexible hose 202 may comprise a rubber material. In some embodiments, the rubber material of the annular flexible hose 202 has a hardness measured on a Shore A scale with a durometer equal to 75+/−10 points. In some embodiments, the rubber material includes a special high temperature resistant synthetic rubber tube. It may further include a single high tensile steel wire braid reinforcement. An oil, weather, and abrasion resistant synthetic outer rubber cover may also be provided for the annular flexible hose 202.

Referring again to FIGS. 2 thru 5, the assembly 200 may further comprise a breather cap 218 that is in fluid communication with the annular channel 212. By rotating the breather cap 216, the pressure of the oil in the internal cavity 128 of the spindle 126, which is in fluid communication with the annular channel 212 of the annular flexible hose 202, may be equilibrated.

The wiring harness 214 and the wiring 216 disposed in the wiring harness 216 extends longitudinally past the first axial end 206 of the annular flexible hose 202 and past the second axial end 208 of the annular flexible hose 202.

The assembly 200 may further comprise a first connector 220 (may also be referred to as a coupling) attached to the first axial end 206 of the annular flexible hose 202 and a second connector 220' attached to the second axial end 208 of the annular flexible hose 202. In some embodiments, such as shown in FIGS. 2 thru 5, the first connector 220 and the second connector 220' are similarly or identically configured, including crimp-on permanent, non-skive type, couplings on both ends. More particularly, the couplings may include swivel ORFS couplings made of hot rolled/hot forged steel. The couplings may further include high density polyethylene that is spirally wrapped around the outside of the couplings.

A wire harness and breather line subassembly 300 that may be used in conjunction with assembly 200 will now be discussed with reference to FIGS. 2 thru 5. The subassembly 300 may comprise an annular flexible hose 202 defining a longitudinal axis 204, a first axial end 206, a second axial end 208, and an aperture 210 extending completely along the longitudinal axis 204 from the first axial end 206 to the second axial end 208. A wiring harness 214 may be disposed in the annular flexible hose 202 positioned at least partially adjacent the longitudinal axis 204, defining at least partially an annular channel 212 between the annular flexible hose 202 and the wiring harness 214. The wiring harness 214 includes wiring 216 disposed in the wiring harness 214.

The annular flexible hose 202 may comprise a rubber material and/or may be constructed as previously described herein. Also, the rubber material may have a hardness as previously described herein.

A breather cap 218 may be in fluid communication with the annular channel 212 as previously described herein.

The wiring harness 214 and the wiring 216 disposed in the wiring harness 214 extends longitudinally past the first axial end 206 of the annular flexible hose 202 and past the second axial end 208 of the annular flexible hose 202. The subassembly 300 may further comprising a first connector 220 attached to the first axial end 206 of the annular flexible hose 202 and a second connector 220' attached to the second axial end 208 of the annular flexible hose 202 in a manner as previously described earlier herein. The first and the second connectors 220, 220' may be configured and constructed as described earlier herein. Any connector/adapter described herein may be manufactured by forging steel parts, etc.

The subassembly 300 may further comprise a bracket 302 that is used to attach the wiring harness 214 to the chassis 102 at a first point. A cable tie mount 304 may be used to attach the wiring harness 214 to the chassis 102 at a second point. The bracket 302 may be made from a 6 mm thick steel plate.

Focusing on FIG. 5, the second connector 220' may be attached to a tee fitting 306 to which the breather cap 218 is attached. The tee fitting 306 may take the form of a three-sided male threaded ORFS tee made from forged steel, etc.

The other side of the tee fitting 306 may be attached via connectors/adapters to a grommet assembly 308. The grommet assembly 308 may include a sealing gland in the form of a brass nickel plated thermoplastic vulcanizing insert that seals about the wiring harness. So, air is inhibited from exiting the assembly 200 or subassembly 300 unless purposely released via the breather cap 218. All other connections and interfaces of the various components of the assembly 200 and subassembly 300 or to be considered to be air tight.

The term "chassis" as used herein should be interpreted to include any permanent, or pseudo-permanent part of the machine. Therefore, the chassis may include any portion of the machine fixed relative to the power source, etc.

Any of the dimensions, configurations, materials, material properties, etc. discussed herein may be varied as needed or desired to be different than any value or characteristic specifically mentioned herein or shown in the drawings.

INDUSTRIAL APPLICABILITY

In practice, a wiring harness and breather line assembly, a wiring harness and breather line subassembly, a machine using a wiring harness and breather line assembly or a wiring harness and breather line subassembly according to any embodiment described herein may be sold, bought, manufactured or otherwise obtained in an OEM (original equipment manufacturer) or after-market context. In some cases, various components, of the assembly, of the subassembly, etc. may be provided as a kit, etc.

Figure 6:
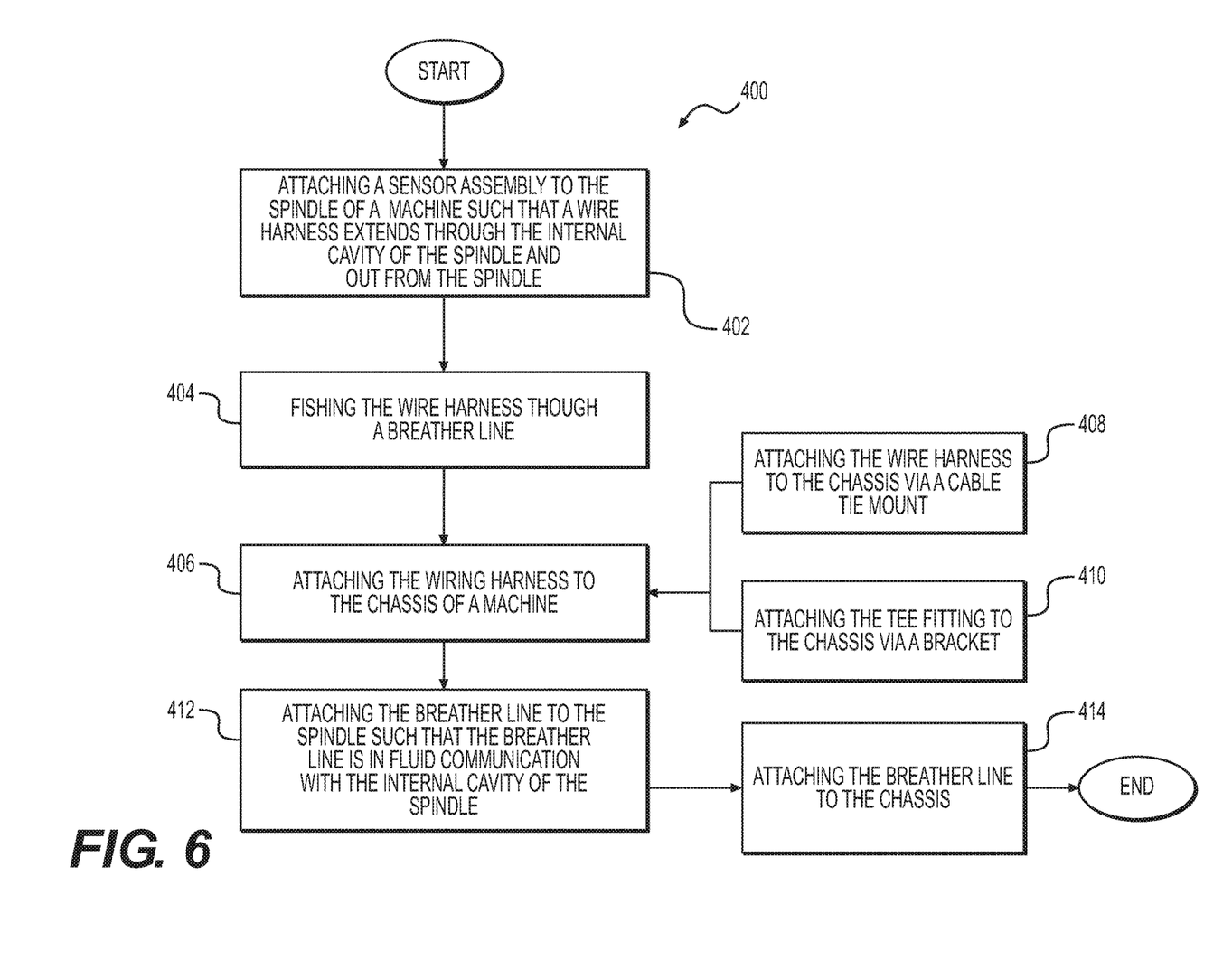
FIG. 6 is a flowchart illustrating the method of assembly using a wheel speed harness and breather line according to an embodiment of the present disclosure.

Referring now to FIG. 6, a method 400 for attaching an assembly or a subassembly to the frame (or chassis) of a machine may be understood. The method may comprise attaching a sensor assembly to the spindle of a machine such that a wire harness extends through the internal cavity of the spindle and out from the spindle (step 402), fishing the wire harness through a breather line (e.g. a flexible annular hose) (step 404), and attaching the wiring harness to the chassis of a machine (step 406). Any of these aforementioned steps may achieved in any suitable chronological order. In some embodiments, step 402 is accomplished before step 404, and step 404 is accomplished before step 406. Step 406 may be achieved by first attaching the wire harness to the chassis via a cable tie mount (step 408) and then by attaching the tee fitting to the chassis via a bracket (step 410). In some embodiments, step 410 is accomplished before step 408. In other embodiments, step 408 is accomplished before step 410.

The method 400 may further comprise attaching the breather line to the spindle such that the breather line is in fluid communication with the internal cavity of the spindle (step 412). The method 400 may further comprise attaching the breather line to the chassis (step 414). Step 412 may occur before step 414 or after step 414. Step 414 may include rotating a connector onto the tee fitting and step 412 may include rotating a connector onto an adapter attached to the spindle.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A wire harness and breather line subassembly comprising:
    an annular flexible hose defining a longitudinal axis, a first axial end, a second axial end, and an aperture extending completely along the longitudinal axis from the first axial end to the second axial end; and
    a wiring harness disposed in the annular flexible hose positioned at least partially adjacent the longitudinal axis, defining at least partially an annular channel between the annular flexible hose and the wiring harness;
    wherein the wiring harness includes wiring disposed in the wiring harness, and liquid is disposed in the annular channel between the annular flexible hose and the wiring harness.

2. The wire harness and breather line subassembly of claim 1 wherein the annular flexible hose comprises a rubber material, and the liquid is oil.

3. The wire harness and breather line subassembly of claim 1 wherein the annular flexible hose has a hardness measured on a Shore A scale with a durometer equal to 75 +/−10 points.

4. The wire harness and breather line subassembly of claim 1 further comprising a breather cap that is in fluid communication with the annular channel.

5. The wire harness and breather line subassembly of claim 1 wherein the wiring harness and the wiring disposed in the wiring harness extends longitudinally past the first axial end of the annular flexible hose and past the second axial end of the annular flexible hose.

6. The wire harness and breather line subassembly of claim 5 further comprising a first connector attached to the first axial end of the annular flexible hose.

7. The wire harness and breather line subassembly of claim 6 further comprising a second connector attached to the second axial end of the annular flexible hose.

8. The wire harness and breather line subassembly of claim 7 wherein the first connector and the second connector are similarly configured, including crimp-on permanent, non-skive type, couplings.

9. The wire harness and breather line subassembly of claim 1 wherein the wiring harness comprises a polyurethane material having a hardness measured on a Shore A scale with a durometer equal to 40+/−5 points.

10. A wire harness and breather line assembly for use with a machine comprising:
   a chassis;
   a spindle movably attached to the chassis;
   a wheel rotatably attached to the spindle;
   an annular flexible hose defining a longitudinal axis, a first axial end, a second axial end, and an aperture extending completely along the longitudinal axis from the first axial end to the second axial end; and
   a wiring harness disposed in the annular flexible hose positioned at least partially adjacent the longitudinal axis, defining at least partially an annular channel between the annular flexible hose and the wiring harness;
   wherein the wiring harness includes wiring disposed in the wiring harness, the wiring harness is attached to the chassis and is attached to the spindle, and the annular flexible hose is attached to the chassis and is attached to the spindle, and a liquid is disposed in the annular channel between the annular flexible hose and the wiring harness.

11. The wire harness and breather line assembly of claim 10 wherein the annular flexible hose comprises a rubber material, and the liquid is oil.

12. The wire harness and breather line assembly of claim 10 wherein the annular flexible hose has a hardness measured on a Shore A scale with a durometer equal to 75 +/−10 points.

13. The wire harness and breather line assembly of claim 10 further comprising a breather cap that is in fluid communication with the annular channel.

14. The wire harness and breather line assembly of claim 10 wherein the wiring harness and the wiring disposed in the wiring harness extends longitudinally past the first axial end of the annular flexible hose and past the second axial end of the annular flexible hose.

15. The wire harness and breather line assembly of claim 14 further comprising a first connector attached to the first axial end of the annular flexible hose.

16. The wire harness and breather line assembly of claim 15 further comprising a second connector attached to the second axial end of the annular flexible hose.

17. The wire harness and breather line assembly of claim 16 wherein the first connector and the second connector are similarly configured, including crimp-on permanent, non-skive type, couplings.

18. The wire harness and breather line assembly of claim 17 wherein the wiring harness comprises a polyurethane material having a hardness measured on a Shore A scale with a durometer equal to 40+/−5 points.

19. A method for attaching a wiring harness and breather line assembly to the frame of a machine, the method comprising:
   attaching a sensor assembly to the spindle of a machine such that a wire harness extends through the internal cavity of the spindle and out from the spindle;
   fishing the wire harness through a breather line;
   attaching the wiring harness to the chassis of a machine; and
   attaching a breather line having a flexible hose about the wiring harness to the spindle such that the flexible hose is later filled with oil that is in communication with the internal cavity of the spindle.

20. The method of claim 19 further comprising:
attaching the breather line to the chassis.

* * * * *